(12) United States Patent
Onitsuka et al.

(10) Patent No.: US 11,413,711 B2
(45) Date of Patent: Aug. 16, 2022

(54) FLUX, RESIN FLUX CORED SOLDER, AND FLUX COATED PELLET

(71) Applicant: Senju Metal Industry Co., Ltd., Tokyo (JP)

(72) Inventors: Motohiro Onitsuka, Tochigi (JP); Yoko Kurasawa, Saitama (JP); Hiroyuki Yamasaki, Tochigi (JP); Atsumi Takahashi, Tochigi (JP); Toshihisa Kugi, Tochigi (JP); Hiroyoshi Kawasaki, Tokyo (JP)

(73) Assignee: Senju Metal Industry Co., Ltd., Tokyo (JP)

(*) Notice: Subject to any disclaimer, the term of this patent is extended or adjusted under 35 U.S.C. 154(b) by 0 days.

(21) Appl. No.: 16/763,853

(22) PCT Filed: Nov. 13, 2018

(86) PCT No.: PCT/JP2018/041920
§ 371 (c)(1),
(2) Date: May 13, 2020

(87) PCT Pub. No.: WO2019/098169
PCT Pub. Date: May 23, 2019

(65) Prior Publication Data
US 2020/0376609 A1    Dec. 3, 2020

(30) Foreign Application Priority Data

Nov. 14, 2017 (JP) .............................. JP2017-219325

(51) Int. Cl.
*B23K 35/36*    (2006.01)
*B23K 35/362*    (2006.01)
(Continued)

(52) U.S. Cl.
CPC .......... *B23K 35/362* (2013.01); *B23K 1/0016* (2013.01); *B23K 35/0244* (2013.01); *B23K 35/3615* (2013.01); *B23K 35/3618* (2013.01)

(58) Field of Classification Search
None
See application file for complete search history.

(56) References Cited

U.S. PATENT DOCUMENTS 4,028,143 A * 6/1977 Stayner .............. B23K 35/3613
148/23
4,988,395 A * 1/1991 Taguchi ................. B23K 35/36
148/23
(Continued)

FOREIGN PATENT DOCUMENTS

CN    1047236 A    11/1990
CN    104797375 A    7/2015
(Continued)

*Primary Examiner* — Devang R Patel
(74) *Attorney, Agent, or Firm* — The Webb Law Firm

(57) ABSTRACT

Provided are a flux, resin flux cored solder and a flux coated pellet which are washable with water. Resin flux cored solder is composed of solder having a linear shape and a flux filled in a substantially central part (core) of the cross section of the solder. The flux contains an amine for salt formation and an organic acid for salt formation, in which the amount of the organic acid is within a range between 10 parts by mass or more and 645 parts by mass or less based on 100 parts by mass of the amine. The organic acid for salt formation is composed of at least one organic acid selected from the group consisting of malonic acid, succinic acid, glutaric acid, tartaric acid, malic acid, diglycolic acid, and citric acid.

9 Claims, 2 Drawing Sheets

(51) Int. Cl.
  *B23K 1/00* (2006.01)
  *B23K 35/02* (2006.01)

(56) References Cited

U.S. PATENT DOCUMENTS

| | | | | |
|---|---|---|---|---|
| 5,215,602 | A | * | 6/1993 | Ali .................... B23K 35/3613 148/23 |
| 5,919,317 | A | * | 7/1999 | Tanahashi .......... B23K 35/3612 148/22 |
| 8,430,294 | B2 | * | 4/2013 | Ho ....................... C07C 215/28 228/180.21 |
| 9,579,738 | B2 | * | 2/2017 | Lee ...................... B23K 35/362 |
| 9,815,149 | B2 | * | 11/2017 | Lee .................... H05K 13/0465 |
| 10,099,321 | B2 | | 10/2018 | Inoue et al. |
| 10,265,808 | B2 | | 4/2019 | Onitsuka et al. |
| 10,583,533 | B2 | | 3/2020 | Maruko et al. |
| 2009/0269598 | A1 | * | 10/2009 | Ohashi .................... H01B 1/22 428/458 |
| 2009/0308496 | A1 | * | 12/2009 | Kawamata ........... B23K 35/383 148/24 |
| 2010/0143658 | A1 | * | 6/2010 | Lawrence .......... B23K 35/3612 428/172 |
| 2011/0237065 | A1 | * | 9/2011 | Kawashiro ........... B23K 3/0623 438/615 |
| 2018/0200845 | A1 | | 7/2018 | Kawanago et al. |

FOREIGN PATENT DOCUMENTS

| | | | |
|---|---|---|---|
| CN | 107249812 | A | 10/2017 |
| CN | 107262968 | A | 10/2017 |
| EP | 0389218 | A1 | 9/1990 |
| JP | 2004176179 | A | 6/2004 |
| JP | 2010046687 | A | 3/2010 |
| JP | 2013041683 | A | 2/2013 |
| JP | 2014117745 | A | 6/2014 |
| JP | 2017100137 | A | 6/2017 |
| JP | 6160788 | B1 | 7/2017 |
| TW | 201529835 | A | 8/2015 |
| TW | 201612198 | A | 4/2016 |
| TW | 201637766 | A | 11/2016 |
| WO | 2017038418 | A1 | 3/2017 |
| WO | 2017141404 | A1 | 8/2017 |
| WO | WO-2017141404 A1 * | 8/2017 | ....... C08G 65/33306 |

* cited by examiner

[FIG. 1A]
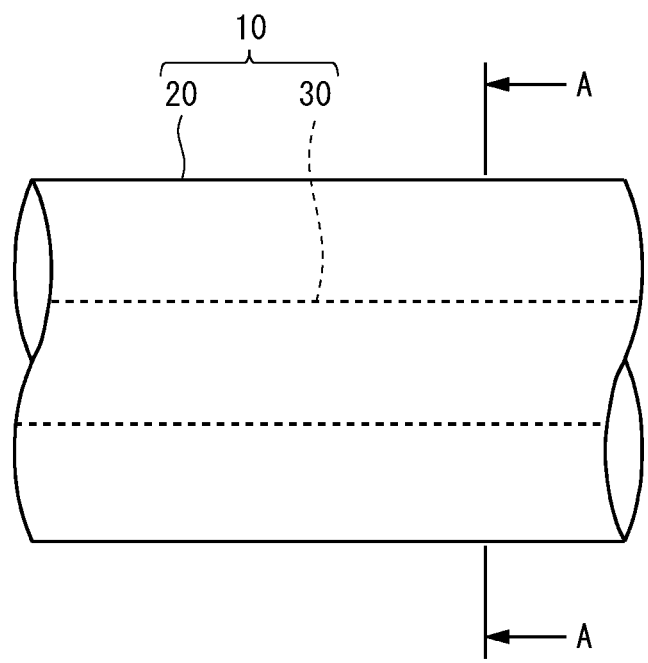
[FIG. 1B]
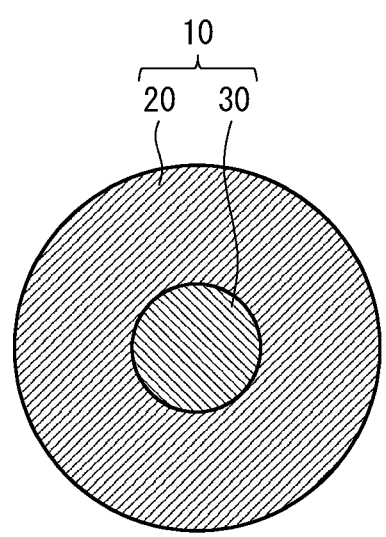

[FIG. 2A]
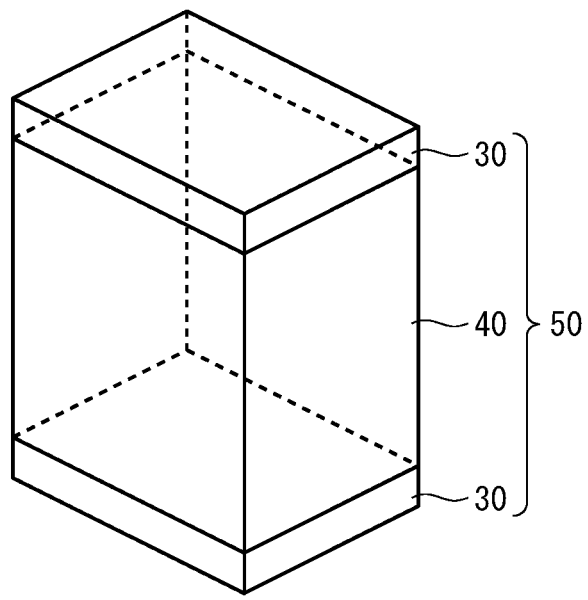
[FIG. 2B]
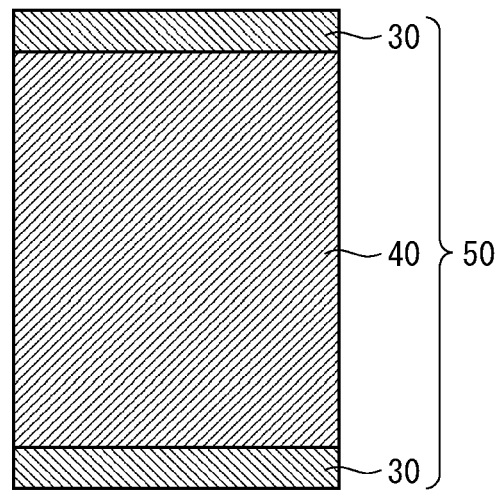

FLUX, RESIN FLUX CORED SOLDER, AND FLUX COATED PELLET

CROSS-REFERENCE TO RELATED APPLICATIONS

This application is the United States national phase of International Application No. PCT/JP2018/041920 filed Nov. 13, 2018, and claims priority to Japanese Patent Application No. 2017-219325 filed Nov. 14, 2017, the disclosures of which are hereby incorporated by reference in their entirety.

TECHNICAL FIELD

The present invention relates to a flux, resin flux cored solder, and a flux coated pellet.

BACKGROUND

Generally, when electronic components are mounted on a printed board, any resin flux cored solder has been widely used. The resin flux cored solder is composed of solder having a linear shape and a flux filled in a substantially central part of the cross section of the solder. As the materials for the flux, for example, pine resin, modified rosins, and synthetic resins are used.

For example, Patent Document 1 describes resin flux cored wire solder having a flux in a concentric central part and an alloy layer provided on the outer periphery of the flux, in which the flux provided in the concentric central part has an alloy powder mixed therein.

Patent Documents

Patent Document 1: JP 2010-046687 A

SUMMARY OF THE INVENTION

However, for example, in the past resin flux cored solder described in Patent Document 1 or the like, the flux contains pine resin or modified rosins. Therefore, when it is necessary to wash flux residues, there has been such a problem that it is difficult to wash the flux residues when water is used as a washing agent, because the flux residues contain pine resin having high lipophilicity, and the like.

Then, the present invention has been made in view of the above problem, and has an object to provide a flux, resin flux cored solder, and a flux coated pellet, which are washable with water.

Means for Solving the Problem

The present investors have found that when an amine and an organic acid, which are known as a flux activator, are used, instead of pine resin and modified rosins, to form a salt which is used as a flux base agent to design a flux composition, flux residues are removable by water washing. The present invention is as follows. Note that, since any pine resin cannot be contained in the flux for allowing water washing, the solder of the present invention should not be actually referred to as "resin flux cored solder", but that, since the shape and usage of the flux are the same as those of the past resin flux cored solders, the solder of the present invention is also referred to as "resin flux cored solder", for convenience.

(1) A flux according to the present invention is characterized in that it contains an amine for salt formation and an organic acid for salt formation wherein the amount of the organic acid is within a range between 10 parts by mass or more and 645 parts by mass or less based on 100 parts by mass of the amine, and the flux is rosin-free.

(2) The flux according to the present invention is characterized in that the amine includes at least one of polyoxyalkylene ethylenediamine and 2,2'-(cyclohexylimino)bisethanol.

(3) The flux according to the present invention is characterized in that the organic acid is composed of at least one of malonic acid, succinic acid, glutaric acid, tartaric acid, malic acid, diglycolic acid and citric acid.

(4) The flux according to the present invention is characterized in that the flux further contains 0% by mass or more and 10% by mass or less of an organic acid not for salt formation, when the amount of the flux containing a salt formed of the amine for salt formation and the organic acid for salt formation is 100% by mass.

(5) The flux according to the present invention is characterized in that the flux further contains 0% by mass or more and 10% by mass or less of an amine not for salt formation, when the amount of the flux containing a salt formed of the amine for salt formation and the organic acid for salt formation is 100% by mass.

(6) The flux according to the present invention is characterized in that the flux further contains 0% by mass or more and 15% by mass or less of an amine halide salt, when the amount of the flux containing a salt formed of the amine for salt formation and the organic acid for salt formation is 100% by mass.

(7) The flux according to the present invention is characterized in that the flux further contains 0% by mass or more and 10% by mass or less of a surfactant, when the amount of the flux containing a salt formed of the amine for salt formation and the organic acid for salt formation is 100% by mass.

(8) The flux according to the present invention is characterized in that the flux is a solid at 25° C., or a liquid at 25° C. with a rotational viscosity of 3500 Pa·s or more at 6 Hz.

(9) Resin flux cored solder according to the present invention is characterized in that the solder contains a linear solder; and the flux according to any one of the above items (1) to (8), the flux being filled in the solder.

(10) A flux coated pellet according to the present invention is characterized in that the pellet contains a solder pellet; and the flux according to any one of the above items (1) to (8), the solder pellet being covered with the flux.

According to the present invention, since the flux can be formed without using pine resin, modified rosins, or the like, the flux residues are removable by water washing.

BRIEF DESCRIPTION OF THE DRAWINGS

FIG. 1A is a plan view showing a configuration example of resin flux cored solder according to one embodiment of the present invention.

FIG. 1B is a cross-sectional view of FIG. 1A.

FIG. 2A is a perspective view showing a configuration example of a pellet according to one embodiment of the present invention.

FIG. 2B is a cross-sectional view of FIG. 2A.

DETAILED DESCRIPTION

Hereinafter, preferred embodiments of the present invention will be described in detail with reference to the attached drawings.

FIG. 1A is a plan view showing an example of the configuration of resin flux cored solder 10 according to one embodiment of the present invention, and FIG. 1B is a cross-sectional view thereof, taken along the line A-A in FIG. 1A.

As shown in FIGS. 1A and 1B, the resin flux cored solder 10 according to the present invention is composed of solder 20 having a linear shape and a flux 30 filled in a substantially central part (axial center) of the cross section of the solder 20.

To the solder 20, for example, an Sn—Ag-based alloy, an Sn—Cu-based alloy, an Sn—Ag—Cu-based alloy, an Sn—In-based alloy, an Sn—Bi-based alloy, and alloys obtained by adding Ag, Cu, Ni, Co, Ge, Sb, In, Bi, Fe, Cr, Zn, or the like to these alloys are available. In addition, to lead-containing alloys, Sn—Pb alloys, Sn—Pb—Ag alloys, Sn—Pb—Bi-based alloys, and alloys obtained by adding Ag, Cu, Ni, Co, Ge, Sb, In, Bi, Fe, Cr, Zn, or the like to these alloys are available.

The flux 30 for the resin flux cored solder contains an amine and an organic acid. In the present embodiment, a salt is formed by neutralizing the amine with the organic acid, and the formed salt functions as a base agent as a substitute for pine resin and modified rosins. As a result, the flux 30 for the resin flux cored solder becomes in a solid or highly viscous liquid state at room temperature. Here, the sentence that "the flux 30 is a highly viscous liquid" refers to the case where, when the viscosity of the flux 30 is measured with a rheometer, the flux 30 has a rotational viscosity of 3500 Pa·s or more at 6 Hz at 25° C. Hereinafter, the amine described above which forms a salt is referred to as amine for salt formation, and the organic acid which forms a salt is referred to as organic acid for salt formation.

To the amine for salt formation, for example, at least one amine selected from the group consisting of polyoxyalkylene ethylenediamine and 2,2'-(cyclohexylimino)bisethanol is available. Polyoxyalkylene ethylenediamine is represented by the following chemical formula:

[Chemical Formula 1]

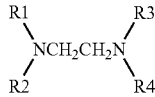

wherein R1 to R4 each represent a side chain. In the polyoxyalkylene ethylenediamine, two polyoxyalkylene groups are respectively bonded to N atoms at both ends of ethylenediamine.

As the polyoxyalkylene ethylenediamine, for example, tetrakis(2-hydroxypropyl)ethylenediamine, polyoxypropylene ethylenediamine, or polyoxyethylene polyoxypropylene ethylenediamine are available.

To the organic acid for salt formation, for example, at least one organic acid selected from the group consisting of malonic acid, succinic acid, glutaric acid, tartaric acid, malic acid, diglycolic acid, and citric acid are available. The organic acid for salt formation functions as an activator for improving the wettability of the solder 20 by heating during soldering.

As regards the ratio (parts by mass) of the amine for salt formation to the organic acid for salt formation in the flux 30, the organic acid for salt formation is within a range between 10 parts by mass or more and 645 parts by mass or less based on 100 parts by mass of the amine for salt formation. By setting the organic acid for salt formation to be within a range between 10 parts by mass or more and 645 parts by mass or less, the salt formed of the organic acid for salt formation and the amine for salt formation can be a solid or a highly viscous liquid.

In addition, the flux 30 for the resin flux cored solder can be configured by adding 0% by mass or more and 10% by mass or less of an organic acid not for salt formation, when the total amount of the flux 30 containing the salt formed of the amine for salt formation and the organic acid for salt formation is 100% by mass. As the organic acid not for salt formation, for example, glycolic acid, propionic acid, 3-hydroxypropionic acid, lactic acid, acrylic acid, glyceric acid, 2,2-bishydroxymethylpropionic acid, 2,2-bishydroxymethylbutane acid or the like are available.

In addition, the flux 30 for the resin flux cored solder can be configured by adding 0% by mass or more and 10% by mass or less of an amine not for salt formation, when the total amount of the flux 30 containing the salt formed of the amine for salt formation and the organic acid for salt formation is 100% by mass. As the amine not for salt formation, for example, methanolamine, dimethylethanolamine, N-methylethanolamine, diethanolamine, triethanolamine, terminal amine (polyoxyethylene-polyoxypropylene) copolymer (terminal amine PEG-PPG copolymer) are available. By adding to the flux 30 an amine not for salt formation, which functions as an activator, the solderability (removability of an oxide film) can be further improved.

In addition, the flux 30 for the resin flux cored solder can be configured by adding 0% by mass or more and 15% by mass or less of an amine halide salt, when the total amount of the flux 30 containing the salt formed of the amine for salt formation and the organic acid for salt formation is 100% by mass. By adding to the flux 30 an amine halide salt that functions as an activator, the solderability (removability of an oxide film) can be further improved.

In addition, the flux 30 for the resin flux cored solder can be configured by adding 0% by mass or more and 10% by mass or less of a surfactant, when the total amount of the flux 30 containing the salt formed of the amine for salt formation and the organic acid for salt formation is 100% by mass. By adding a surfactant to the flux 30, water washability can be improved.

In addition, the flux 30 for the resin flux cored solder can be configured by adding 0% by mass or more and 25% by mass or less, in total, of an organic acid not for salt formation, an amine not for salt formation and an amine halide salt, when the total amount of the flux 30 containing the salt formed of the amine for salt formation and the organic acid for salt formation is 100% by mass. By adding an organic acid not for salt formation, an amine not for salt formation and an amine halide salt to the flux 30, water washability can be improved.

As described above, according to the present embodiment, since the flux 30 is formed without using any pine resin or modified rosins, flux residues can be reliably removed even when water is used as washing liquid. In addition, since water can be used as the washing liquid, it is possible to realize simple and environmentally friendly washing of flux residues. The resin flux cored solder 10 according to the present embodiment can be used, for example, at the time of repair work on a soldered portion of a substrate soldered with a water-soluble paste or the like.

In the above embodiment, an example has been explained in which the flux 30 is applied to the resin flux cored solder 10 having a linear shape, but the present invention is not limited to this. For example, the flux 30 described above can be used as a flux for solder pellet coating.

FIGS. 2A and 2B show an example of the configuration of a flux coated pellet 50 using the flux 30. As shown in FIGS. 2A and 2B, the flux coated pellet 50 is composed of a solder pellet body 40 having a rectangular parallelepiped shape, and the flux 30 covering the upper and lower surfaces thereof. The same material as that for the solder 20 described above, for example, an Sn—Ag—Cu-based alloy, is available to the solder pellet body 40. For the flux 30, the material described above, specifically, a material containing an amine and an organic acid, are available. After being heated and melted, the flux 30 is applied to each of the upper and lower surfaces of the solder pellet body 40. Note that by applying the flux 30 not only to the upper and lower surfaces of the solder pellet body 40 but also to the side surface (peripheral surface) of the solder pellet body 40, the entire solder pellet body 40 may be covered with the flux 30. According to the flux coated pellet 50 of the present embodiment, since the flux 30 is formed without using any pine resin or modified rosins, flux residues can be reliably removed even when water is used as washing liquid, as described above.

EXECUTED EXAMPLES

Prepared were fluxes having the compositions of the Executed Examples and Comparative Examples, shown in Tables 1 to 3 below, and the solidifiability of the prepared fluxes and the washability of flux residues were verified. Note that the present invention is not limited to the following specific examples.

(1) Method of Evaluating the Solidifiability of Flux

Each of the prepared fluxes was stored at room temperature of 25° C., and it was determined whether the flux was a solid or a liquid. When a flux was a liquid, the viscosity of the flux was measured with a rheometer. Specifically, the viscosity of the flux was measured by sandwiching the flux between plates of the rheometer (Thermo Scientific HAAKE MARS III) and then rotating the plates at 6 Hz.

The viscosity of each of the fluxes was evaluated according to the following criteria.
⊚: Case where the flux was a solid when the flux was stored at 25° C.;
◯: Case where the flux was a liquid when the flux was stored at 25° C., but the viscosity measured with the rheometer was 3500 Pa·s or more; and
x: Case where the flux was a liquid when the flux was stored at 25° C., and the viscosity measured with the rheometer was less than 3500 Pa·s.

(2) Method of Evaluating Washability of Flux Residue

On a copper land of a glass epoxy substrate, the resin flux cored solder filled with the fluxes of the Executed Examples and Comparative Examples was heated and melted for 5 seconds using a 350° C. soldering iron. Then, the glass epoxy substrate was washed with water. Subsequently, the glass epoxy substrate after washing was observed with an optical microscope.

The washability of each of the flux residues was evaluated according to the following criteria.
◯ (Good): Case where flux residues were almost completely removed and the glass epoxy substrate surface was sufficiently glossy or slightly dull; and
x (Bad): Case where there are a small or large amount of flux residues.

Tables 1 to 3 show the compositional ratios of the fluxes for resin flux cored solder used in the Executed Examples and Comparative Examples, and also show the evaluation results of the solidifiability and the washability of flux residues when each flux was used. The numerical values for the amines for salt formation and the organic acids for salt formation in Tables 1 to 3 are expressed in parts by mass when the amount of the respective amines for salt formation is 100 parts by mass. The numerical values for the salts composed of the amines for salt formation and the organic acids for salt formation, the amine not for salt formation, the organic acid not for salt formation, the amine halide salts, the surfactants, and the rosin are expressed in % by mass when the total amount of the respective fluxes is 100% by mass. As regards the comprehensive evaluation of the solidifiability and water washability of each flux, the case where any one of the items has been determined to be x is evaluated as "x" indicating an inadequate flux. Further, in Tables 1 to 3, the amine for salt formation is referred to as amine A, the organic acid for salt formation is referred to as organic acid A, the amine not for salt formation is referred to simply as amine, and the organic acid not for salt formation is referred to simply as organic acid.

TABLE 1

| Category | Reagent name | | EXECUTED EXAMPLE 1 | EXECUTED EXAMPLE 2 | EXECUTED EXAMPLE 3 |
|---|---|---|---|---|---|
| Amine A | Polyoxyalkylene ethylenediamine | Tetrakis(2-hydroxypropyl)ethylenediamine Polyoxypropylene ethylenediamine Polyoxyethylene polyoxypropylene ethylenediamine | 100.0 | 100.0 | 100.0 |
| | 2,2'-(Cyclohexylimino)bisethanol | | | | |
| Organic acid A | Tartaric acid | | 10.3 | 17.1 | 25.6 |
| | Malic acid | | | | |
| | Diglycolic acid | | | | |
| | Malonic acid | | | | |
| | Succinic acid | | | | |
| | Glutaric acid | | | | |
| | Adipic acid | | | | |
| | Citric acid | | | | |
| Amine A-organic acid A salt | Amount of amine A and organic acid A formulated | | 100.0 | 100.0 | 100.0 |
| Rosin | Acid-modified rosin | | | | |
| Surfactant | Glycerol | | | | |
| | Lauryldimethylamine oxide | | | | |

TABLE 1-continued

| Category | Reagent name | | EXECUTED EXAMPLE 1 | EXECUTED EXAMPLE 2 | EXECUTED EXAMPLE 3 |
|---|---|---|---|---|---|
| Organic acid | 2,2-bishydroxymethylpropionic acid | | | | |
| Amine | Terminal amine PEG-PPG copolymer | | | | |
| Amine halide salt | Cyclohexylamine tetrafluoroborate | | | | |
| | Cyclohexylamine hydrochloride | | | | |
| | Ethylamine hydrobromide | | | | |
| | 2-Phenylimidazole hydrobromide | | | | |
| | Total | | 100.0 | 100.0 | 100.0 |
| Details of evaluation | Solidifiability at room temperature | | ○ | ◎ | ◎ |
| | Water washability | | ○ | ○ | ○ |
| | Comprehensive evaluation | | ○ | ○ | ○ |

| Category | Reagent name | | EXECUTED EXAMPLE 4 | EXECUTED EXAMPLE 5 | EXECUTED EXAMPLE 6 |
|---|---|---|---|---|---|
| Amine A | Polyoxyalkylene ethylenediamine | Tetrakis(2-hydroxypropyl)ethylenediamine | 100.0 | 100.0 | 100.0 |
| | | Polyoxypropylene ethylenediamine | | | |
| | | Polyoxyethylene polyoxypropylene ethylenediamine | | | |
| | 2,2'-(Cyclohexylimino)bisethanol | | | | |
| Organic acid A | Tartaric acid | | 34.2 | 51.3 | 102.6 |
| | Malic acid | | | | |
| | Diglycolic acid | | | | |
| | Malonic acid | | | | |
| | Succinic acid | | | | |
| | Glutaric acid | | | | |
| | Adipic acid | | | | |
| | Citric acid | | | | |
| Amine A-organic acid A salt | Amount of amine A and organic acid A formulated | | 100.0 | 100.0 | 100.0 |
| Rosin | Acid-modified rosin | | | | |
| Surfactant | Glycerol | | | | |
| | Lauryldimethylamine oxide | | | | |
| Organic acid | 2,2-bishydroxymethylprapionic acid | | | | |
| Amine | Terminal amine PEG-PPG copolymer | | | | |
| Amine halide salt | Cyclohexylamine tetrafluoroborate | | | | |
| | Cyclohexylamine hydrochloride | | | | |
| | Ethylamine hydrobromide | | | | |
| | 2-Phenylimidazole hydrobromide | | | | |
| | Total | | 100.0 | 100.0 | 100.0 |
| Details of evaluation | Solidifiability at room temperature | | ◎ | ◎ | ◎ |
| | Water washability | | ○ | ○ | ○ |
| | Comprehensive evaluation | | ○ | ○ | ○ |

| Category | Reagent name | | EXECUTED EXAMPLE 7 | EXECUTED Example 8 | EXECUTED EXAMPLE 9 | EXECUTED EXAMPLE 10 |
|---|---|---|---|---|---|---|
| Amine A | Polyoxyalkylene ethylenediamine | Tetrakis(2-hydroxypropyl)ethylenediamine | 100.0 | 100.0 | 100.0 | 100.0 |
| | | Polyoxypropylene ethylenediamine | | | | |
| | | Polyoxyethylene polyoxypropylene ethylenediamine | | | | |
| | 2,2'-(Cyclohexylimino)bisethanol | | | | | |
| Organic acid A | Tartaric acid | | 615.6 | | | |
| | Malic acid | | | 102.6 | | |
| | Diglycolic acid | | | | 102.6 | |
| | Malonic acid | | | | | 71.2 |
| | Succinic acid | | | | | |
| | Glutaric acid | | | | | |
| | Adipic acid | | | | | |
| | Citric acid | | | | | |
| Amine A-organic acid A salt | Amount of amine A and organic acid A formulated | | 100.0 | 100.0 | 100.0 | 100.0 |
| Rosin | Acid-modified rosin | | | | | |
| Surfactant | Glycerol | | | | | |
| | Lauryldimethylamine oxide | | | | | |
| Organic acid | 2,2-bishydroxymethylprapionic acid | | | | | |
| Amine | Terminal amine PEG-PPG copolymer | | | | | |
| Amine halide salt | Cyclohexylamine tetrafluoroborate | | | | | |
| | Cyclohexylamine hydrochloride | | | | | |
| | Ethylamine hydrobromide | | | | | |
| | 2-Phenylimidazole hydrobromide | | | | | |
| | Total | | 100.0 | 100.0 | 100.0 | 100.0 |
| Details of evaluation | Solidifiability at room temperature | | ◎ | ◎ | ◎ | ○ |
| | Water washability | | ○ | ○ | ○ | ○ |
| | Comprehensive evaluation | | ○ | ○ | ○ | ○ |

TABLE 1-continued

| Category | | Reagent name | EXECUTED EXAMPLE 11 | EXECUTED EXAMPLE 12 | EXECUTED EXAMPLE 13 |
|---|---|---|---|---|---|
| Amine A | Polyoxyalkylene ethylenediamine | Tetrakis(2-hydroxypropyl)ethylenediamine | 100.0 | 100.0 | 100.0 |
| | | Polyoxypropylene ethylenediamine | | | |
| | | Polyoxyethylene polyoxypropylene ethylenediamine | | | |
| | 2,2'-(Cyclohexylimino)bisethanol | | | | |
| Organic acid A | Tartaric acid | | | | |
| | Malic acid | | | | |
| | Diglycolic acid | | | | |
| | Malonic acid | | | | |
| | Succinic acid | | 80.7 | | |
| | Glutaric acid | | | 90.3 | |
| | Adipic acid | | | | |
| | Citric acid | | | | 87.6 |
| Amine A-organic acid A salt | Amount of amine A and organic acid A formulated | | 100.0 | 100.0 | 100.0 |
| Rosin | Acid-modified rosin | | | | |
| Surfactant | Glycerol | | | | |
| | Lauryldimethylamine oxide | | | | |
| Organic acid | 2,2-bishydroxymethylprapionic acid | | | | |
| Amine | Terminal amine PEG-PPG copolymer | | | | |
| Amine halide salt | Cyclohexylamine tetrafluoroborate | | | | |
| | Cyclohexylamine hydrochloride | | | | |
| | Ethylamine hydrobromide | | | | |
| | 2-Phenylimidazole hydrobromide | | | | |
| | Total | | 100.0 | 100.0 | 100.0 |
| Details of evaluation | Solidifiability at room temperature | | ○ | ○ | ◎ |
| | Water washability | | ○ | ○ | ○ |
| | Comprehensive evaluation | | ○ | ○ | ○ |

TABLE 2

| Category | | Reagent name | EXECUTED EXAMPLE 14 | EXECUTED EXAMPLE 15 | EXECUTED EXAMPLE 16 | EXECUTED EXAMPLE 17 |
|---|---|---|---|---|---|---|
| Amine A | Polyoxyalkylene ethylenediamine | Tetrakis(2-hydroxypropyl)ethylenediamine | 100.0 | 100.0 | | |
| | | Polyoxypropylene ethylenediamine | | | | |
| | | Polyoxyethylene polyoxypropylene ethylenediamine | | | 100.0 | |
| | 2,2'-(Cyclohexylimino)bisethanol | | | | | 100.0 |
| Organic acid A | Tartaric acid | | 17.1 | 615.6 | 205.2 | 80.2 |
| | Malic acid | | | | | |
| | Diglycolic acid | | | | | |
| | Malonic acid | | | | | |
| | Succinic acid | | | | | |
| | Glutaric acid | | | | | |
| | Adipic acid | | | | | |
| | Citric acid | | | | | |
| Amine A-organic acid A salt | Amount of amine A and organic acid A formulated | | 100.0 | 100.0 | 100.0 | 100.0 |
| Rosin | Acid-modified rosin | | | | | |
| Surfactant | Glycerol | | | | | |
| | Lauryldimethylamine oxide | | | | | |
| Organic acid | 2,2-bishydroxymethylpropionic acid | | | | | |
| Amine | Terminal amine PEG-PPG copolymer | | | | | |
| Amine halide salt | Cyclohexylamine tetrafluoroborate | | | | | |
| | Cyclohexylamine hydrochloride | | | | | |
| | Ethylamine hydrobromide | | | | | |
| | 2-Phenylimidazole hydrobromide | | | | | |
| | Total | | 100.0 | 100.0 | 100.0 | 100.0 |
| Details of evaluation | Solidifiability at room temperature | | ◎ | ◎ | ◎ | ○ |
| | Water washability | | ○ | ○ | ○ | ○ |
| | Comprehensive evaluation | | ○ | ○ | ○ | ○ |

TABLE 2-continued

| Category | Reagent name | | EXECUTED EXAMPLE 18 | EXECUTED EXAMPLE 19 | EXECUTED EXAMPLE 20 | EXECUTED EXAMPLE 21 |
|---|---|---|---|---|---|---|
| Amine A | Polyoxyalkylene ethylenediamine | Tetrakis(2-hydroxypropyl)ethylenediamine | | | 100.0 | 100.0 |
| | | Polyoxypropylene ethylenediamine | | | | |
| | | Polyoxyethylene polyoxypropylene ethylenediamine | | | | |
| | 2,2'-(Cyclohexylimino)bisethanol | | 100.0 | 100.0 | | |
| Organic acid A | Tartaric acid | | 160.4 | 641.5 | 51.3 | 51.3 |
| | Malic acid | | | | | |
| | Diglycolic acid | | | | | |
| | Malonic acid | | | | | |
| | Succinic acid | | | | | |
| | Glutaric acid | | | | | |
| | Adipic acid | | | | | |
| | Citric acid | | | | | |
| Amine A-organic acid A salt | Amount of amine A and organic acid A formulated | | 100.0 | 100.0 | 90.0 | 95.0 |
| Rosin | Acid-modified rosin | | | | | |
| Surfactant | Glycerol | | | | | |
| | Lauryldimethylamine oxide | | | | | |
| Organic acid | 2,2-bishydroxymethylpropionic acid | | | | | |
| Amine | Terminal amine PEG-PPG copolymer | | | | 10.0 | |
| Amine halide salt | Cyclohexylamine tetrafluoroborate | | | | | 5.0 |
| | Cyclohexylamine hydrochloride | | | | | |
| | Ethylamine hydrobromide | | | | | |
| | 2-Phenylimidazole hydrobromide | | | | | |
| | Total | | 100.0 | 100.0 | 100.0 | 100.0 |
| Details of evaluation | Solidifiability at room temperature | | ◉ | ◉ | ◉ | ◉ |
| | Water washability | | ○ | ○ | ○ | ○ |
| | Comprehensive evaluation | | ○ | ○ | ○ | ○ |

| Category | Reagent name | | EXECUTED EXAMPLE 22 | EXECUTED EXAMPLE 23 | EXECUTED EXAMPLE 24 | EXECUTED EXAMPLE 25 |
|---|---|---|---|---|---|---|
| Amine A | Polyoxyalkylene ethylenediamine | Tetrakis(2-hydroxypropyl)ethylenediamine | 100.0 | 100.0 | 100.0 | 100.0 |
| | | Polyoxypropylene ethylenediamine | | | | |
| | | Polyoxyethylene polyoxypropylene ethylenediamine | | | | |
| | 2,2'-(Cyclohexylimino)bisethanol | | | | | |
| Organic acid A | Tartaric acid | | 51.3 | 51.3 | 51.3 | 51.3 |
| | Malic acid | | | | | |
| | Diglycolic acid | | | | | |
| | Malonic acid | | | | | |
| | Succinic acid | | | | | |
| | Glutaric acid | | | | | |
| | Adipic acid | | | | | |
| | Citric acid | | | | | |
| Amine A-organic acid A salt | Amount of amine A and organic acid A formulated | | 95.0 | 95.0 | 95.0 | 90.0 |
| Rosin | Acid-modified rosin | | | | | |
| Surfactant | Glycerol | | | | | 10.0 |
| | Lauryldimethylamine oxide | | | | | |
| Organic acid | 2,2-bishydroxymethylpropionic acid | | | | | |
| Amine | Terminal amine PEG-PPG copolymer | | | | | |
| Amine halide salt | Cyclohexylamine tetrafluoroborate | | | | | |
| | Cyclohexylamine hydrochloride | | 5.0 | | | |
| | Ethylamine hydrobromide | | | 5.0 | | |
| | 2-Phenylimidazole hydrobromide | | | | 5.0 | |
| | Total | | 100.0 | 100.0 | 100.0 | 100.0 |
| Details of evaluation | Solidifiability at room temperature | | ◉ | ◉ | ◉ | ○ |
| | Water washability | | ○ | ○ | ○ | ○ |
| | Comprehensive evaluation | | ○ | ○ | ○ | ○ |

| Category | Reagent name | | EXECUTED EXAMPLE 26 | EXECUTED EXAMPLE 27 | EXECUTED EXAMPLE 28 |
|---|---|---|---|---|---|
| Amine A | Polyoxyalkylene ethylenediamine | Tetrakis(2-hydroxypropyl)ethylenediamine | 100.0 | 100.0 | 100.0 |
| | | Polyoxypropylene ethylenediamine | | | |
| | | Polyoxyethylene polyoxypropylene ethylenediamine | | | |
| | 2,2'-(Cyclohexylimino)bisethanol | | | | |

TABLE 2-continued

| | | | | | |
|---|---|---|---|---|---|
| Organic acid A | Tartaric acid | | 51.3 | 51.3 | 51.3 |
| | Malic acid | | | | |
| | Diglycolic acid | | | | |
| | Malonic acid | | | | |
| | Succinic acid | | | | |
| | Glutaric acid | | | | |
| | Adipic acid | | | | |
| | Citric acid | | | | |
| Amine A-organic acid A salt | Amount of amine A and organic acid A formulated | | 97.0 | 90.0 | 65.0 |
| Rosin | Acid-modified rosin | | | | |
| Surfactant | Glycerol | | | | 10.0 |
| | Lauryldimethylamine oxide | | 3.0 | | |
| Organic acid | 2,2-bishydroxymethylpropionic acid | | | 10.0 | 10.0 |
| Amine | Terminal amine PEG-PPG copolymer | | | | |
| Amine halide salt | Cyclohexylamine tetrafluoroborate | | | | |
| | Cyclohexylamine hydrochloride | | | | |
| | Ethylamine hydrobromide | | | | 15.0 |
| | 2-Phenylimidazole hydrobromide | | | | |
| | Total | | 100.0 | 100.0 | 100.0 |
| Details of evaluation | Solidifiability at room temperature | | ◎ | ○ | ○ |
| | Water washability | | ○ | ○ | ○ |
| | Comprehensive evaluation | | ○ | ○ | ○ |

TABLE 3

| Category | Reagent name | | COMPARATIVE EXAMPLE 1 | COMPARATIVE EXAMPLE 2 | COMPARATIVE EXAMPLE 3 |
|---|---|---|---|---|---|
| Amine A | Polyoxyalkylene ethylenediamine | Tetrakis(2-hydroxypropyl)ethylenediamine | 100.0 | 100.0 | 100.0 |
| | | Polyoxypropylene ethylenediamine | | | |
| | | Polyoxyethylene polyoxypropylene ethylenediamine | | | |
| | 2,2'-(Cyclohexylimino)bisethanol | | | | |
| Organic acid A | Tartaric acid | | 5.1 | | 51.3 |
| | Malic acid | | | | |
| | Diglycolic acid | | | | |
| | Malonic acid | | | | |
| | Succinic acid | | | | |
| | Glutaric acid | | | | |
| | Adipic acid | | | 99.9 | |
| | Citric acid | | | | |
| Amine A-organic acid A salt | Amount of amine A and organic acid A formulated | | 100 | 100.0 | 80.0 |
| Rosin | Acid-modified rosin | | | | 20.0 |
| Organic acid | 2,2-bishydroxymethylpropionic acid | | | | |
| Surfactant | Glycerol | | | | |
| | Lauryldimethylamine oxide | | | | |
| Amine | Terminal amine PEG-PPG copolymer | | | | |
| Amine halide salt | Cyclohexylamine tetrafluoroborate | | | | |
| | Cyclohexylamine hydrochloride | | | | |
| | Ethylamine hydrobromide | | | | |
| | 2-Phenylimidazole hydrobromide | | | | |
| | Total | | 100.0 | 100.0 | 100.0 |
| Details of evaluation | Solidifiability at room temperature | | X | ○ | ◎ |
| | Water washability | | ○ | X | X |
| | Comprehensive evaluation | | X | X | X |

As shown in Executed Examples 1 to 7 in Table 1, it was found that, when tartaric acid as an organic acid was added in an amount of 10.3 parts by mass or more and 616.5 parts by mass or less based on 100 parts by mass of tetrakis(2-hydroxypropyl)ethylenediamine as an amine for salt formation, in the flux composition, the solidifiability of the flux at room temperature was a solid or a highly viscous liquid. Note that, since the content of the organic acid in Executed Example 1 was lower than those in Executed Examples 2 to 7, the flux was not a solid but a highly viscous liquid, in the end. Regarding the water washability, it was also found that, in all of Executed Examples 1 to 7, flux residues could be removed with water. From these results, the comprehensive evaluations of the fluxes of Executed Examples 1 to 7 were "○".

As shown in Executed Example 8 in Table 1, it was also found that, even when malic acid as an organic acid was added in an amount of 102.6 parts by mass based on 100 parts by mass of tetrakis(2-hydroxypropyl)ethylenediamine as an amine for salt formation, in the flux composition, the solidifiability of the flux at room temperature was a solid. Regarding the water washability, it was found that flux residues could be removed with water. From these results, the comprehensive evaluation of the flux of Executed Example 8 was "○".

As shown in Executed Example 9 in Table 1, it was found that, even when diglycolic acid as an organic acid was added in an amount of 102.6 parts by mass based on 100 parts by mass of tetrakis(2-hydroxypropyl)ethylenediamine as an amine for salt formation, in the flux composition, the solidifiability of the flux at room temperature was a solid. Regarding the water washability, it was also found that flux residues could be removed with water. From these results, the comprehensive evaluation of the flux of Executed Example 9 was "○".

As shown in Executed Example 10 in Table 1, it was found that, even when malonic acid as an organic acid for salt formation was added in an amount of 71.2 parts by mass based on 100 parts by mass of tetrakis(2-hydroxypropyl)ethylenediamine as an amine for salt formation, in the flux composition, the solidifiability of the flux at room temperature was a highly viscous liquid. Regarding the water washability, it was also found that flux residues could be removed with water. From these results, the comprehensive evaluation of the flux of Executed Example 10 was "○".

As shown in Executed Example 11 in Table 1, it was found that, when succinic acid as an organic acid for salt formation was added in an amount of 80.7 parts by mass based on 100 parts by mass of tetrakis(2-hydroxypropyl)ethylenediamine as an amine for salt formation, in the flux composition, the solidifiability of the flux at room temperature was a highly viscous liquid. Regarding the water washability, it was also found that flux residues could be removed with water. From these results, the comprehensive evaluation of the flux of Executed Example 11 was "○".

As shown in Executed Example 12 in Table 1, it was found that, even when glutaric acid as an organic acid for salt formation was added in an amount of 90.3 parts by mass based on 100 parts by mass of tetrakis(2-hydroxypropyl)ethylenediamine as an amine for salt formation, in the flux composition, the solidifiability of the flux at room temperature was a highly viscous liquid. Regarding the water washability, it was also found that flux residues could be removed with water. From these results, the comprehensive evaluation of the flux of Executed Example 12 was "○".

As shown in Executed Example 13 in Table 1, it was found that, even when citric acid as an organic acid for salt formation was added in an amount of 87.6 parts by mass based on 100 parts by mass of tetrakis(2-hydroxypropyl)ethylenediamine as an amine for salt formation, in the flux composition, the solidifiability of the flux at room temperature was a solid. Regarding the water washability, it was also found that flux residues could be removed with water. From these results, the comprehensive evaluation of the flux of Executed Example 13 was "○".

As shown in Executed Example 14 in Table 2, it was found that, even when tartaric acid as an organic acid for salt formation was added in an amount of 17.1 parts by mass based on 100 parts by mass of polyoxypropylene ethylenediamine as an amine for salt formation, in the flux composition, the solidifiability of the flux at room temperature was a solid. Regarding the water washability, it was also found that flux residues could be removed with water. From these results, the comprehensive evaluation of the flux of Executed Example 14 was "○".

As shown in Executed Example 15 in Table 2, it was found that, even when tartaric acid as an organic acid for salt formation was added in an amount of 615.6 parts by mass based on 100 parts by mass of polyoxypropylene ethylenediamine as an amine for salt formation, in the flux composition, the solidifiability of the flux at room temperature was a solid. Regarding the water washability, it was also found that flux residues could be removed with water. From these results, the comprehensive evaluation of the flux of Executed Example 15 was "○".

As shown in Executed Example 16 in Table 2, it was found that, even when tartaric acid as an organic acid for salt formation was added in an amount of 205.2 parts by mass based on 100 parts by mass of polyoxyethylene polyoxypropylene ethylenediamine as an amine for salt formation, in the flux composition, the solidifiability of the flux at room temperature was a solid. Regarding the water washability, it was also found that flux residues could be removed with water. From these results, the comprehensive evaluation of the flux of Executed Example 16 was "○".

As shown in Executed Example 17 in Table 2, it was found that, even when tartaric acid as an organic acid for salt formation was added in an amount of 80.2 parts by mass based on 100 parts by mass of 2,2'-(cyclohexylimino)bisethanol as an amine for salt formation, in the flux composition, the solidifiability of the flux at room temperature was a highly viscous liquid. Regarding the water washability, it was also found that flux residues could be removed with water. From these results, the comprehensive evaluation of the flux of Executed Example 17 was "○".

As shown in Executed Example 18 in Table 2, it was found that, even when tartaric acid as an organic acid for salt formation was added in an amount of 160.4 parts by mass based on 100 parts by mass of 2,2'-(cyclohexylimino)bisethanol as an amine for salt formation, in the flux composition, the solidifiability of the flux at room temperature was a highly viscous liquid. Regarding the water washability, it was also found that flux residues could be removed with water. From these results, the comprehensive evaluation of the flux of Executed Example 18 was "○".

As shown in Executed Example 19 in Table 2, it was found that, even when tartaric acid as an organic acid for salt formation was added in an amount of 641.5 parts by mass based on 100 parts by mass of 2,2'-(cyclohexylimino)bisethanol as an amine for salt formation, in the flux composition, the solidifiability of the flux at room temperature was a highly viscous liquid. Regarding the water washability, it was also found that flux residues could be removed with water. From these results, the comprehensive evaluation of the flux of Executed Example 19 was "○".

Further, in Executed Example 20 in Table 2, the flux contained 90% by mass of a product obtained by adding 51.3 parts by mass of tartaric acid as an organic acid for salt formation to 100 parts by mass of tetrakis(2-hydroxypropyl)ethylenediamine as an amine for salt formation and 10% by mass of a terminal amine PEG-PPG copolymer (terminal amine (polyoxyethylene glycol-polyoxypropylene glycol) copolymer), the total amount of the flux being 100% by mass. In this case, it was also found that the solidifiability of the flux at room temperature was a solid. Regarding the water washability, it was also found that flux residues could be removed with water. From these results, the comprehensive evaluation of the flux of Executed Example 20 was "○".

In Executed Example 21 in Table 2, the flux contained 95% by mass of a product obtained by adding 51.3 parts by mass of tartaric acid as an organic acid for salt formation to 100 parts by mass of tetrakis(2-hydroxypropyl)ethylenediamine as an amine for salt formation and 5% by mass of cyclohexylamine tetrafluoroborate, the total amount of the flux being 100% by mass. In this case, it was also found that the solidifiability of the flux at room temperature was a solid. Regarding the water washability, it was also found that flux residues could be removed with water. From these results, the comprehensive evaluation of the flux of Executed Example 21 was "○".

In Executed Example 22 in Table 2, the flux contained 95% by mass of a product obtained by adding 51.3 parts by mass of tartaric acid as an organic acid for salt formation to 100 parts by mass of tetrakis(2-hydroxypropyl)ethylenediamine as an amine for salt formation and 5% by mass of cyclohexylamine hydrochloride, the total amount of the flux being 100% by mass. In this case, it was also found that the solidifiability of the flux at room temperature was a solid. Regarding the water washability, it was also found that flux residues could be removed with water. From these results, the comprehensive evaluation of the flux of Executed Example 22 was "○".

In Executed Example 23 in Table 2, the flux contained 95% by mass of a product obtained by adding 51.3 parts by mass of tartaric acid as an organic acid for salt formation to 100 parts by mass of tetrakis(2-hydroxypropyl)ethylenediamine as an amine for salt formation and 5% by mass of ethylamine hydrobromide, the total amount of the flux being 100% by mass. In this case, it was also found that the solidifiability of the flux at room temperature was a solid. Regarding the water washability, it was also found that flux residues could be removed with water. From these results, the comprehensive evaluation of the flux of Executed Example 23 was "○".

In Executed Example 24 in Table 2, the flux contained 95% by mass of a product obtained by adding 51.3 parts by mass of tartaric acid as an organic acid for salt formation to 100 parts by mass of tetrakis(2-hydroxypropyl)ethylenediamine as an amine for salt formation and 5% by mass of 2-phenylimidazole hydrobromide, the total amount of the flux being 100% by mass. In this case, it was also found that the solidifiability of the flux at room temperature was a solid. Regarding the water washability, it was also found that flux residues could be removed with water. From these results, the comprehensive evaluation of the flux of Executed Example 24 was "○".

In Executed Example 25 in Table 2, the flux contained 90% by mass of a product obtained by adding 51.3 parts by mass of tartaric acid as an organic acid for salt formation to 100 parts by mass of tetrakis(2-hydroxypropyl)ethylenediamine as an amine for salt formation and 10% by mass of glycerol, the total amount of the flux being 100% by mass. In this case, it was also found that the solidifiability of the flux at room temperature was a highly viscous liquid. Regarding the water washability, it was also found that flux residues could be removed with water. From these results, the comprehensive evaluation of the flux of Executed Example 25 was "○".

In Executed Example 26 in Table 2, the flux contained 97% by mass of a product obtained by adding 51.3 parts by mass of tartaric acid as an organic acid for salt formation to 100 parts by mass of tetrakis(2-hydroxypropyl)ethylenediamine as an amine for salt formation and 3% by mass of lauryldimethylamine oxide, the total amount of the flux being 100% by mass. In this case, it was also found that the solidifiability of the flux at room temperature was a solid. Regarding the water washability, it was also found that flux residues could be removed with water. From these results, the comprehensive evaluation of the flux of Executed Example 26 was "○".

In Executed Example 27 in Table 2, the flux contained 90% by mass of a product obtained by adding 51.3 parts by mass of tartaric acid as an organic acid for salt formation to 100 parts by mass of tetrakis(2-hydroxypropyl)ethylenediamine as an amine for salt formation and 10% by mass of 2,2,-bishydroxymethylpropionic acid as an organic acid not for salt formation, the total amount of the flux being 100% by mass. In this case, it was also found that the solidifiability of the flux at room temperature was a highly viscous liquid. Regarding the water washability, it was also found that flux residues could be removed with water. From these results, the comprehensive evaluation of the flux of Executed Example 27 was "○".

In Executed Example 28 in Table 2, the flux contained 65% by mass of a product obtained by adding 51.3 parts by mass of tartaric acid as an organic acid for salt formation to 100 parts by mass of tetrakis(2-hydroxypropyl)ethylenediamine as an amine for salt formation was, 10% by mass of glycerol, 10% by mass of 2,2-bishydroxymethylpropionic acid, and 15% by mass of ethylamine hydrobromide, the total amount of the flux being 100% by mass. In this case, it was also found that the solidifiability of the flux at room temperature was a highly viscous liquid. Regarding the water washability, it was also found that flux residues could be removed with water. From these results, the comprehensive evaluation of the flux of Executed Example 28 was "○".

Contrary to this, as shown in Comparative Example 1 in Table 3, it was found that, when tartaric acid as an organic acid for salt formation was added in an amount of 5.1 parts by mass to 100 parts by mass of tetrakis(2-hydroxypropyl) ethylenediamine as an amine for salt formation, in the flux composition, the solidifiability of the flux at room temperature was low viscous (liquid). On the other hand, regarding the water washability, it was found that flux residues could be removed with water. From these results, the comprehensive evaluation of the flux of Comparative Example 1 was "x".

As shown in Comparative Example 2 in Table 3, it was found that, when adipic acid as an organic acid for salt formation was added in an amount of 99.9 parts by mass to 100 parts by mass of tetrakis(2-hydroxypropyl)ethylenediamine as an amine for salt formation, in the flux composition, the solidifiability of the flux at room temperature was a highly viscous liquid. On the other hand, regarding the water washability, it was found that flux residues could not be completely removed with water. From these results, the comprehensive evaluation of the flux of Comparative Example 2 was "x".

In Comparative Example 3 in Table 3, based on 100% by mass of the total flux, 80% by mass of a salt was formed by adding 51.3 parts by mass of tartaric acid as an organic acid for salt formation to 100 parts by mass of tetrakis(2-hydroxypropyl)ethylenediamine as an amine for salt formation, and 20% by mass of acid-modified rosin as a rosin was added thereto. In this case, it was found that the solidifiability of the flux at room temperature was a solid. On the other hand, regarding the water washability, it was found that flux residues could not be completely removed with water. From these results, the comprehensive evaluation of the flux of Comparative Example 3 was "x".

In the above-described Executed Examples, the executed examples in which malonic acid, succinic acid, glutaric acid, tartaric acid, malic acid, diglycolic acid, and citric acid were each used alone as an organic acid for salt formation have been explained. However, it was found that, even when at least two of malonic acid, succinic acid, glutaric acid, tartaric acid, malic acid, diglycolic acid, and citric acid were used in combination as an organic acid for salt formation, the solidifiability of the flux was a solid or a highly viscous liquid. Regarding the water washability, it was also found that flux residues could be washed with water.

Further, the above-mentioned flux is heated and melted, and applied to the surface of the solder pellet, so that it can be used as a flux for solder pellet coating. Flux residues after soldering using the flux coated pellet could be similarly washed with water.

EXPLANATION OF CODES

10: Resin flux cored solder
20: Solder
30: Flux
40: Solder pellet body
50: Flux coated pellet

The invention claimed is:

1. A flux, consisting of:
    an amine for salt formation, wherein the amine for salt formation includes at least one of polyoxyalkylene ethylenediamine and 2,2'-(cyclohexylimino)bisethanol;
    an organic acid for salt formation; and
    optionally, one or more of the following:
        an organic acid not for salt formation;
        an amine not for salt formation;
        an amine halide salt; and
        a surfactant,
    wherein the amount of the organic acid for salt formation is within a range between 100 parts by mass or more and 645 parts by mass or less based on 100 parts by mass of the amine for salt formation, the flux is rosin-free, and the flux is a solid at 25° C., or a liquid at 25° C. with a rotational viscosity of 3500 Pa·s or more when plates of a rheometer are rotated at 6 Hz, and
    wherein the amine not for salt formation is selected from the group consisting of: methanolamine, dimethylethanolamine, N-methylethanolamine, triethanolamine, terminal amine (polyoxyethylene-polyoxypropylene) copolymer (terminal amine PEG-PPG copolymer), and combinations thereof.

2. The flux according to claim 1, wherein the organic acid for salt formation is composed of at least one of malonic acid, succinic acid, glutaric acid, tartaric acid, malic acid, diglycolic acid, and citric acid.

3. A resin flux cored solder, comprising:
    a linear solder; and
    the flux according to claim 1, the flux being filled in the solder.

4. A flux coated pellet, comprising:
    a solder pellet; and
    the flux according to claim 1, the solder pellet being covered with the flux.

5. The flux according to claim 1, wherein the organic acid not for salt formation is present in an amount of more than 0% by mass and 10% by mass or less, when the total amount of the flux is 100% by mass.

6. The flux according to claim 1, wherein the amine not for salt formation is present in an amount of more than 0% by mass and 10% by mass or less, when the total amount of the flux is 100% by mass.

7. The flux according to claim 1, wherein the amine halide salt is present in an amount of more than 0% by mass and 15% by mass or less, when the total amount of the flux is 100% by mass.

8. The flux according to claim 1, wherein the surfactant is present in an amount of more than 0% by mass and 10% by mass or less, when the total amount of the flux is 100% by mass.

9. The flux according to claim 1, wherein the organic acid not for salt formation is selected from the group consisting of: glycolic acid, propionic acid, 3-hydroxypropionic acid, lactic acid, acrylic acid, glyceric acid, 2,2-bishydroxymethylpropionic acid, 2,2-bishydroxymethylbutane acid, and combinations thereof.

* * * * *